United States Patent
Chung et al.

(10) Patent No.: US 11,711,218 B2
(45) Date of Patent: Jul. 25, 2023

(54) TRUST-BASED SHARD DISTRIBUTION APPARATUS AND METHOD FOR FAULT TOLERANT BLOCKCHAIN NETWORKS

(71) Applicant: INDUSTRY-ACADEMIC COOPERATION FOUNDATION, YONSEI UNIVERSITY, Seoul (KR)

(72) Inventors: Jong-Moon Chung, Seoul (KR); Ju Sik Yun, Seoul (KR); Yun Yeong Goh, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 356 days.

(21) Appl. No.: 17/006,871

(22) Filed: Aug. 30, 2020

(65) Prior Publication Data
US 2021/0067319 A1    Mar. 4, 2021

(30) Foreign Application Priority Data
Aug. 30, 2019    (KR) .................. 10-2019-0107485

(51) Int. Cl.
*H04L 9/32*    (2006.01)
*H04L 9/06*    (2006.01)
(Continued)

(52) U.S. Cl.
CPC ............ *H04L 9/3239* (2013.01); *G06F 18/22* (2023.01); *H04L 9/0637* (2013.01); *H04L 9/50* (2022.05); *H04L 2209/463* (2013.01)

(58) Field of Classification Search
CPC .................... H04L 9/0637; H04L 9/50; H04L 2209/463; H04L 9/3239; H04L 63/0815;
(Continued)

(56) References Cited

U.S. PATENT DOCUMENTS 10,262,140 B2 *    4/2019    Smith ................... G06F 21/575
11,238,164 B2 *    2/2022    Ricotta .................. H04L 9/065
(Continued)

FOREIGN PATENT DOCUMENTS

KR    10-2019-0067581 A    6/2019
WO    2017109140 A1    6/2017

OTHER PUBLICATIONS

Xin Chen et al., GlobalTrust: An attack-resilient reputation system for tactical networks, 2014 11th Annual IEEE International Conference on Sensing, Communication, and Networking. Jun. 30, 2014, 275-283 pages. <DOI: 10.1109/SAHCN.2014.6990363>.
(Continued)

*Primary Examiner* — Taghi T Arani
*Assistant Examiner* — Blake I Narramore (57) ABSTRACT

A shard distribution apparatus and method are disclosed. The shard distribution apparatus can include a trust calculation unit configured to obtain a trust value for each of a multiple number of nodes in a blockchain network by receiving a consensus result from each of the multiple nodes, where the consensus result may be obtained by aggregating the result of verifying the validity of a block by each of the multiple nodes and the results of verifying the validity of the block received from other nodes; and a shard distribution unit configured to distribute the multiple nodes to a multiple number of shards by calculating a shard trust value, which is represented by a sum of trust values of nodes distributed to each of the multiple shards, and distributing the multiple nodes such that deviations of the calculated shard trust values are the smallest.

12 Claims, 8 Drawing Sheets

(51) Int. Cl.
*G06F 18/22* (2023.01)
*H04L 9/00* (2022.01)

(58) Field of Classification Search
CPC ............ H04L 63/0869; H04L 67/1097; G06K 9/6215; G06F 16/278; G06F 16/2365
See application file for complete search history.

(56) References Cited

U.S. PATENT DOCUMENTS

| | | | |
|---|---|---|---|
| 2011/0252121 A1* | 10/2011 | Borgs | G06Q 10/10 709/223 |
| 2016/0224949 A1* | 8/2016 | Thomas | G06Q 20/401 |
| 2017/0075941 A1* | 3/2017 | Finlow-Bates | H04L 9/3239 |
| 2017/0310653 A1* | 10/2017 | Zhang | H04L 63/0838 |
| 2018/0089436 A1 | 3/2018 | Smith et al. | |
| 2019/0140935 A1* | 5/2019 | Kikinis | G06F 16/182 |
| 2019/0182313 A1* | 6/2019 | Yoo | H04L 67/10 |
| 2019/0205552 A1* | 7/2019 | Espinosa | H04L 9/0637 |
| 2019/0370250 A1* | 12/2019 | Tipton | G06Q 20/3829 |
| 2020/0127821 A1* | 4/2020 | Dolev | H04L 9/085 |
| 2020/0128022 A1* | 4/2020 | Bleikertz | H04L 9/3247 |
| 2020/0233973 A1* | 7/2020 | Ahmed | G06F 21/64 |
| 2021/0160056 A1* | 5/2021 | Yan | H04L 67/1097 |

OTHER PUBLICATIONS

Hyunkyung Yoo et al., The Blockchain for Domain based Static Sharding, 2018 17th IEEE International Conference On Trust, Security And Privacy In Computing And Communications/ 12th IEEE International Conference On Big Data Science And Engineering. Aug. 1, 2018. 1689-1692pages. <DOI: 10.1109/ TrustCom/ BigDataSE.2018.00252>.

Sunho Seo et al., Reconfiguration time and complexity minimized trust-based clustering scheme for MANETs, EURASIP Journal on Wireless Communications and Networking vol. 2017, Article No. 155, Sep. 18, 2017. <DOI: 10.1186/ s13638-017-0938-8>.

\* cited by examiner

| | $N_1$ | $N_2$ | $N_3$ | $N_4$ | $N_5$ | $N_6$ |
|---|---|---|---|---|---|---|
| | $S_1$ | $S_1$ | $S_1$ | $S_3$ | $S_3$ | $S_2$ |
| | $S_1$ | $S_2$ | $S_2$ | $S_3$ | $S_1$ | $S_2$ |

Parent Chromosome (a)

| | $N_1$ | $N_2$ | $N_3$ | $N_4$ | $N_5$ | $N_6$ |
|---|---|---|---|---|---|---|
| | $S_1$ | $S_2$ | $S_1$ | $S_3$ | $S_1$ | $S_2$ |
| | $S_1$ | $S_1$ | $S_2$ | $S_3$ | $S_3$ | $S_2$ |

Offspring Chromosome (b)

TRUST-BASED SHARD DISTRIBUTION APPARATUS AND METHOD FOR FAULT TOLERANT BLOCKCHAIN NETWORKS

CROSS-REFERENCE TO RELATED APPLICATIONS

This application claims priority under 35 U.S.C. § 119 to, and the benefit of, Korean Patent Application No. 10-2019-0107485, filed with the Korean Intellectual Property Office on Aug. 30, 2019, the disclosure of which is incorporated herein by reference in its entirety.

BACKGROUND

1. Technical Field

The present disclosure relates to a blockchain network, more particularly to a trust-based shard distribution apparatus and method for a fault tolerant blockchain network.

2. Description of the Related Art

A blockchain relates to a decentralized distributed transaction management technology that was developed to break away from previous centralized storage methods in which the transactions of a centralized institution were stored at a single position. In a blockchain, the transactions and transactional ledgers are examined by all verifier nodes by way of a P2P (peer-to-peer) system, and if agreed upon by more than half of the nodes, each verification node stores the corresponding transaction block in the form of a hash chain. As a technology for distributed data storage, the blockchain was conceived to make it impossible for a malicious administrator to manipulate data or transactions. Blockchain technology is currently mainly used in cryptocurrency. A blockchain is known as a data structure that is practically impervious to data manipulation, since manipulating data requires modifying all of the blocks of the more than half of the nodes participating as verifiers within a limited amount of time.

However, due to the low processing rate for the transactions (or transactions per second) resulting from each of the multiple nodes having to verify a block, it is difficult to apply the blockchain to real time services. To resolve this problem, recent blockchain-related techniques have adopted the sharding technique, which is to distribute multiple nodes over a multiple number of shards (shard groups) and partitioning multiple transactions over the distributed shards to be processed in parallel. In a sharding technique, the parallel processed transactions have side chain structures that connect to blocks within the shards.

However, in adopting the sharding technique, there is the problem that the number of nodes for verifying transactions may be decreased in correspondence to the number of shards, whereby the risk of data manipulation from a consensus attack by malicious nodes may be increased. A consensus attack is the most dangerous type of attack against a blockchain. In a blockchain, a verification group including multiple nodes verifies a block basically through a consensus of a majority, and blocks that do not reach a majority consensus are discarded and cannot connect to the chain. However, if malicious nodes occupy a majority of a verification group, then false blocks can connect to the chain.

Since a verification group in a block chain include tens of thousands to hundreds of thousands of nodes, it is in general realistically impossible for malicious nodes to occupy a majority. However, when the sharding technique is adopted, an increase in the number of shards causes a decrease in the number of nodes in each shard, so that it becomes possible for the number of malicious nodes to occupy a majority. That is, the number of nodes that an attacker needs to compromise is reduced, and there is a possibility of a false block connecting to the chain. In particular, if malicious nodes are concentrated in a particular shard, the possibility of an incorrect verification occurring may be greatly increased.

To remedy this vulnerability, current sharding techniques have the multiple nodes distributed randomly over multiple shards with the condition that each shard must have hundreds to thousands nodes or more for security. However, simply increasing the number of nodes per shard is not an efficient answer and may hinder the expansion of blockchain services.

SUMMARY

An aspect of the disclosure is to provide a shard distribution apparatus and method that calculate the trust value of each of the multiple nodes and distribute the multiple nodes over the shards such that the sum of the trust values of nodes included in each of the multiple number of shards is similar.

Another aspect of the disclosure is to provide a shard distribution apparatus and method that distribute multiple nodes over multiple shards based on a genetic algorithm that minimizes the deviations in trust values between shards.

An embodiment of the disclosure, conceived to achieve the objectives above, provides a shard distribution apparatus that includes: a trust calculation unit configured to obtain a trust value for each of a multiple number of nodes in a blockchain network by receiving a consensus result from each of the multiple nodes, where the consensus result may be obtained by aggregating the result of verifying the validity of a block by each of the multiple nodes and the results of verifying the validity of the block received from other nodes; and a shard distribution unit configured to distribute the multiple nodes to a multiple number of shards by calculating a shard trust value, which is represented by a sum of trust values of nodes distributed to each of the multiple shards, and distributing the multiple nodes such that deviations of the calculated shard trust values are the smallest.

The shard distribution unit can distribute the nodes such that nodes having the same trust value are not assigned to the same shard.

The shard distribution unit can distribute the multiple nodes randomly to a multiple number of shards, arrange the indexes of the shards to which the multiple nodes have been distributed as genes to obtain a multiple number of parent chromosomes, select at least one gene from among the genes of a pair of parent chromosomes selected from the multiple parent chromosomes and exchange corresponding genes to obtain offspring chromosomes, select at least one gene from the obtained offspring chromosomes and mutate the selected gene to another shard index, accumulate the deviations between trust values obtained for the multiple shards based on the shard indexes formed as genes arranged in the mutated offspring chromosomes, and, if the accumulated trust value deviations do not exceed a predefined threshold deviation, then distribute the multiple nodes based on the shard indexes formed as genes arranged in the mutated offspring chromosomes, but if the accumulated trust value deviations do exceed the threshold deviation, then set the offspring chromosomes as parent chromosomes and again obtain and mutate offspring chromosomes.

The shard distribution unit can select at least one gene from the offspring chromosomes, find nodes having the same trust value as that of the node corresponding to the selected gene, and provide mutation such that a shard index for the selected gene is different from those of nodes that were determined as having the same trust value.

The shard distribution unit can receive a subjective consensus opinion (hereinafter referred to as "SCO") vector from each of the multiple nodes of the blockchain network, combine the SCO vectors to obtain a local consensus result (hereinafter referred to as "LCR") matrix, and calculate the trust value for each of the multiple nodes by using the LCR matrix, where each of the multiple nodes may obtain the SCO vector by verifying the validity of a block and aggregating its validity verification result with the validity verification results made by other nodes.

The trust calculation unit can receives a multiple number of SCO vectors, which may each be obtained by each of the multiple nodes individually aggregating approvals and disapprovals determined as validity verification results at the multiple nodes; convert the approvals and disapprovals in each of the multiple SCO vectors into numerical values according to ratios of the number of approvals and the number of disapprovals; combine the SCO vectors to obtain the LCR matrix, calculate a mean trust value, which represents an evaluation by other nodes of each of the multiple nodes, based on the numerical values of the LCR matrix; calculate a trust weight, which represents the degree of similarity between multiple SCO vectors, based on the numerical values of the LCR matrix; and calculate a trust value for each of the multiple nodes by multiplying the calculated mean trust value with the trust weight.

Another embodiment of the disclosure, conceived to achieve the objectives above, provides a shard distribution method that includes: obtaining a trust value for each of a multiple number of nodes in a blockchain network by receiving a consensus result from each of the multiple nodes, where the consensus result may be obtained by aggregating the result of verifying the validity of a block by each of the multiple nodes and the results of verifying the validity of the block received from other nodes; and distributing the multiple nodes to a multiple number of shards by calculating a shard trust value, which may be represented by a sum of trust values of nodes distributed to each of the multiple shards, and distributing the multiple nodes such that deviations of the calculated shard trust values are the smallest.

Thus, a shard distribution apparatus and method according to an embodiment of the disclosure can prevent malicious nodes from being concentrated in a particular shard by calculating trust values for the multiple nodes and distributing the nodes such that the deviations in trust values between shards are minimized based on the calculated trust values of the nodes. This can suppress collusion by malicious nodes in each shard, thereby preventing not only abnormal consensus attacks but also passive attacks in which malicious nodes modulate the opinions of other nodes while proceeding with the consensus in a normal manner. That is, the reliability of the blockchain network can be improved, and a reliable blockchain network can be provided, even when the numbers of verification nodes included in the shards are small, to allow an efficient expansion of the application fields of the blockchain network.

Additional aspects and advantages of the present disclosure will be set forth in part in the description which follows, and in part will be obvious from the description, or may be learned by practice of the invention.

DETAILED DESCRIPTION

To sufficiently understand the present invention, its advantages, and the objectives achieved by practice of the disclosure, it is necessary to refer to the appended drawings which illustrate preferred embodiments of the disclosure as well as the descriptions provided for the appended drawings.

The present disclosure is described in detail below, through a description of preferred embodiments of the disclosure with reference to the accompanying drawings. However, the invention can be implemented in various different forms and is not limited to the described embodiments. For a clearer understanding of the invention, parts that are not of great relevance to the invention have been omitted, and like reference numerals in the drawings are used to represent like elements.

Throughout the specification, reference to a part "including" or "comprising" an element does not preclude the existence of one or more other elements and can mean other elements are further included, unless there is specific mention to the contrary. Also, terms such as "unit", "device", "module", "block", etc., refer to units for processing at least one function or operation, where such units can be implemented as hardware, software, or a combination of hardware and software.

Figure 1:
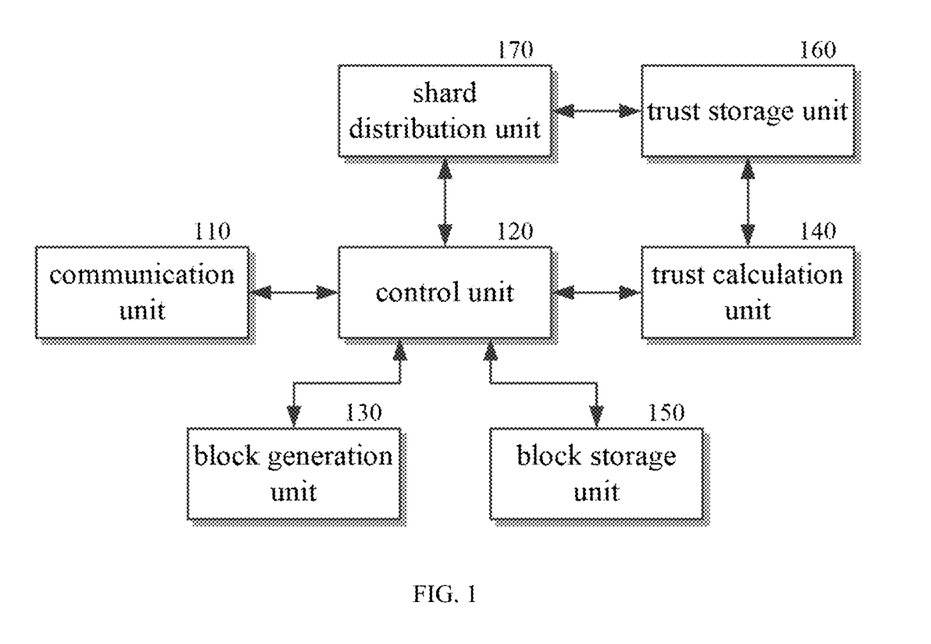
FIG. 1 schematically illustrates the structure of multiple nodes in a blockchain network according to an embodiment of the disclosure.
Figure 2:
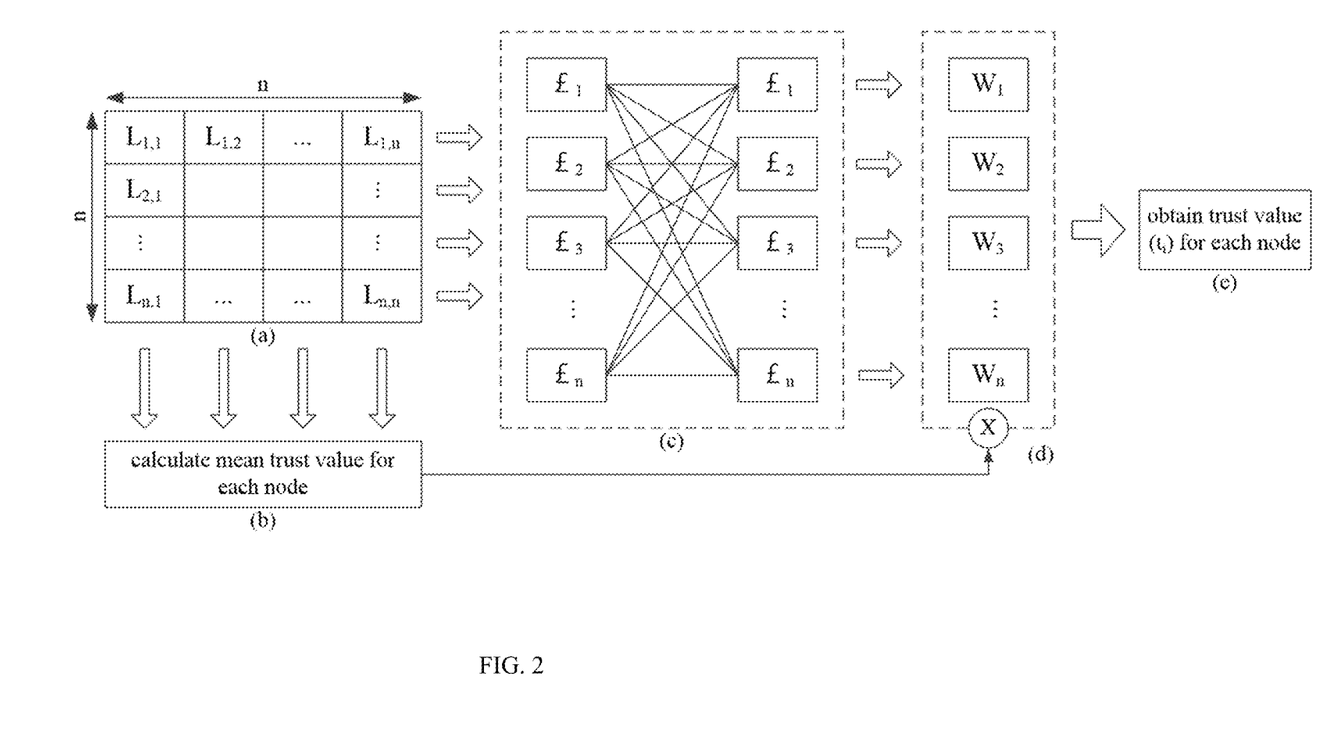
FIG. 2 illustrates a process by which the trust calculation unit of FIG. 1 calculates a trust value for each of the multiple nodes.
Figure 3:
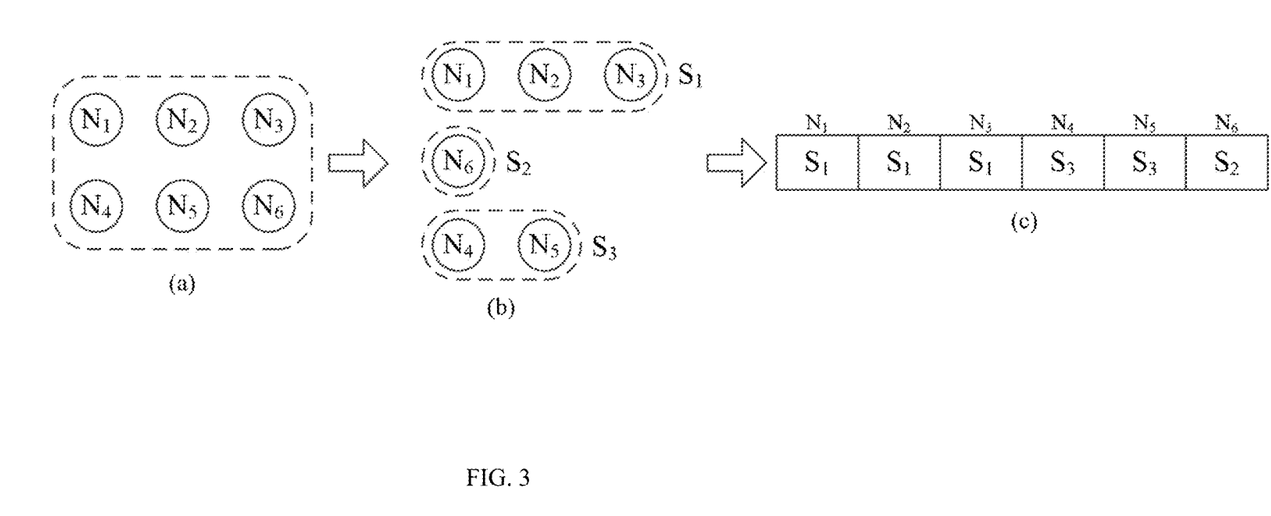
FIG. 3, FIG. 4, and FIG. 5 illustrate a process by which the shard distribution unit of FIG. 1 distributes multiple nodes to multiple shards based on a genetic algorithm.
Figure 4:
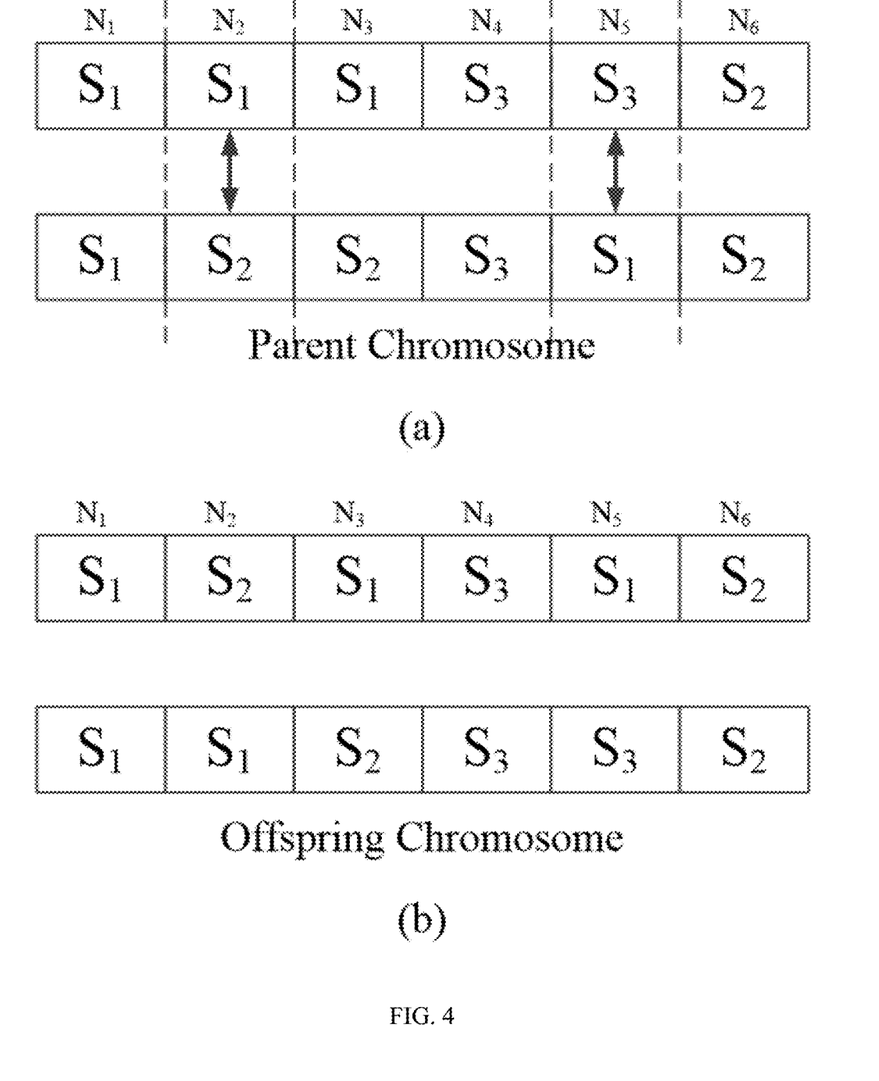
Figure 5:
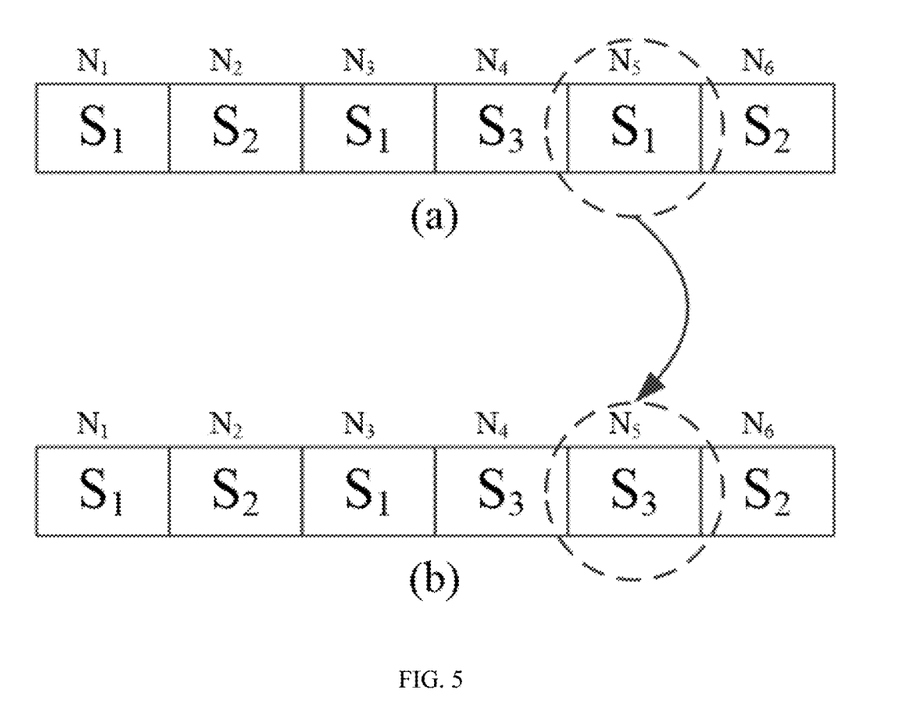

FIG. 1 schematically illustrates the structure of multiple nodes in a blockchain network according to an embodiment of the disclosure, FIG. 2 illustrates a process by which the trust calculation unit of FIG. 1 calculates a trust value for each of the multiple nodes, and FIGS. 3 to 5 illustrate a process by which the shard distribution unit of FIG. 1 distributes multiple nodes to multiple shards based on a genetic algorithm.

The multiple nodes of a blockchain network basically function as verification nodes for verifying the validity of a block, and at least one of the multiple nodes may function as a shard manager, i.e. a shard distribution apparatus, that distributes the multiple nodes of the blockchain network to a multiple number of shards.

In the following, the composition of a verification node is first described, after which the composition of a shard manager is described additionally.

Referring to FIG. 1, the multiple number of verification nodes of a blockchain network can each include a communication unit 110, a control unit 120, a block generation unit 130, a trust calculation unit 140, and a block storage unit 150.

The communication unit 110 allows each of the multiple nodes to communicate with other nodes of the blockchain network, and the control unit 120 controls the components of the node to not only transfer data internally between components but also control the communication unit 110 to transmit and receive data to and from other nodes.

The block generation unit 130 may collect, record, and verify transactions that have to be processed and may thus generate a block, when the node is selected as a block proposer. Here, if the multiple nodes have already been distributed to the multiple shards, the block generation unit 130 can generate a block by collecting the transactions that have to be processed by the shard to which the corresponding node belongs. The generated block may be propagated to the blockchain network by way of the communication unit 110.

The block generator can be selected according to a proof of work (PoW) or a proof of stake (PoS) technique. In the proof of work (PoW) technique, all of the verification nodes perform a procedure for finding a hash value below a particular difficulty prior to generating each block, and the node that has proposed the lowest hash value from among the hash values below a particular difficulty is selected as the block generator. Here, the generated block undergoes a consensus procedure by the multiple nodes of the blockchain network and, if a consensus of a majority is achieved, is pronounced a final block, to be connected to the blockchain previously stored at each node.

The proof of stake (PoS) technique is a technique proposed to reduce the excessive hash computation load required by the proof of work (PoW) technique and entails selecting the block generator according to the stake held by each node and how long a duration the stake was held. If all of the nodes have the same stakes and stake holding durations, then the block generator can be selected randomly with the same probability for the multiple nodes.

In this embodiment, it is assumed for example that the block generator is selected according to the proof of stake (PoS) technique and that the multiple nodes are selected randomly with the same probability to be the block generator.

The trust calculation unit 140 may verify the validity of the block generated and propagated by the node selected as the block generator and may decide whether or not to approve the block by also considering the verification results of the other nodes to determine the block consensus result. Here, if the node is included in a particular shard, then the trust calculation 140 can receive the block generated by the block generator of the corresponding shard and the block verification results of the other nodes.

The trust calculation unit 140 may verify the validity of the block proposed by the block generator and may add a "Y" mark to represent approval if the block is determined to be a valid block or add an "N" mark to represent disapproval if the block is determined to be an invalid block. Here, the trust calculation unit 140 may transmit its validity verification result to the other nodes and may receive and analyze the validity verification results from the other nodes to verify the validity of the proposed block as a block consensus result.

That is, if there are an n number of nodes in the blockchain network, then at each of the multiple nodes, the trust calculation unit 140 may generate a vector of dimensions 1×n for each proposed block and may record, in the generated vector, an approval (Y) or disapproval (N) as the validity verification result determined at each of the n number of nodes. If the number of approvals (Y) is greater than or equal to n/2, then the proposed block is determined to be valid according to the block consensus result.

While the block consensus result determined at the trust calculation unit 140 is an aggregation of the verification opinions of the multiple nodes, this can be regarded as a subjective consensus opinion (hereinafter referred to as "SCO") vector obtained by aggregating the validity verification opinion of each of the multiple nodes. In the following, the SCO vector obtained from the i-th node of the n number of nodes is denoted as $S_i$. That is, an SCO vector ($S_i$) of dimensions 1×n may be obtained from each of the n nodes.

If a majority of the multiple nodes have determined that a block is valid, then the trust calculation unit 140 may store the corresponding block by connecting the block to the previously stored blockchain in the block storage unit 150. Also, the trust calculation unit 140 may transfer the subjective consensus opinion ($S_i$) to the shard manager of the blockchain network.

The block storage unit 150 may receive and store the block that has been determined to be valid by the trust calculation unit 140. Here, the block storage unit 150 may store the received block by connecting it to the previously stored blockchain. The stored blockchain can be propagated to the other nodes of the blockchain network.

The above describes the composition when a node serves as a verification node for verifying the validity of a proposed block in the blockchain network. However, as mentioned above, at least one of the multiple nodes of the blockchain network can also serve as a shard manager.

In cases where the node is a shard manager, the trust calculation unit 140 may receive the SCO vectors ($S_i$) obtained from the multiple nodes to obtain a local consensus result (LCR) matrix and, based on the obtained LCR matrix, may calculate the average trust value and trust weight (W) for each node to calculate the trust value of each node.

With reference to FIG. 2, which illustrates the process by which the trust calculation unit 140 of the shard manager obtains the trust value for each node, the trust calculation unit 140 may first aggregate the SCO vector ($S_i$) obtained from each of the multiple nodes to obtain an LCR matrix (L) as illustrated in part (a).

The trust calculation unit 140 may convert the approvals (Y) and disapprovals (N) in the n number of 1×n SCO vectors ($S_i$) received from the n number of nodes into ratios of the number of approvals (n(Y)) and the number of disapprovals (n(N)) as in Equation 1.

$$\frac{n(Y)}{n(Y)+n(N)}, \frac{n(N)}{n(Y)+n(N)} \qquad \text{[Equation 1]}$$

For example, suppose that, in a blockchain network having three nodes, each node has obtained (Y, Y, N) as a SCO vector ($S_i$) and transmitted the vector to the shard manager. In this case, the trust calculation unit 140 of the shard manager can convert each of the SCO vectors ($S_i$) for the nodes into (⅔, ⅔, ⅓). However, if a third node from among the three nodes is a malicious node and has transmitted the SCO vector ($S_3$) after altering it to (N, Y, N), then the trust calculation unit 140 of the shard manager can convert the SCO vector ($S_3$) of the third node into (⅔, ⅓, ⅔).

Then, the converted SCO vectors ($S_i$) may be combined to provide an LCR matrix (L), which is a vector having the dimensions n×n. In the LCR matrix (L), a vector having dimensions n×n, each element can be expressed as $L_{i,j}$, which represents the trust value of the j-th node as evaluated by the i-th node.

Once the LCR matrix (L) is obtained, then, as illustrated in part (b), the trust calculation unit 140 of the shard manager can calculate the mean trust value ($u_j$) according to Equation 2 as an objective index reflecting the evaluation of a particular node (denoted here as the j-th node, for example) by other nodes, based on the LCR matrix (L).

$$\sum_{i=1}^{n} \frac{L_{i,j}}{n} = u_j \quad \text{[Equation 2]}$$

That is, the mean value of each row of the LCR matrix (L) may be obtained to calculate a mean trust value for each of the n nodes. Here, the mean trust value ($u_j$) may be calculated to apply a penalty on abnormal consensus activity by malicious nodes.

When all of the nodes in the blockchain network are normal, the SCO vectors ($S_i$) transmitted respectively from the multiple nodes should all have the same value. However, malicious nodes can compose and transmit false SCO vectors ($S_i$). In the LCR matrix (L), the i-th row vector may be denoted as £$_i$, where the i-th tow vector (£$_i$) represents the trust report of the i-th node.

Then, the trust similarity between nodes may be analyzed, as illustrated in part (c), to calculate the trust weight ($W_i$) of each node. Here, the trust similarity between the i-th node and the j-th node can be calculated by using cosine similarity between the i-th row vector (£$_i$) and the j-th row vector (£$_j$) as in Equation 3.

$$W_{i,j} = \cos(£_i, £_j) \quad \text{[Equation 3]}$$

From Equation 3, the trust weight ($W_i$) of the i-th node can be calculated as a mean of the degrees of similarity between the corresponding node and all other nodes as in Equation 4.

$$W_i = \sum_{j=1}^{n} \frac{W_{i,j}}{n} \quad \text{[Equation 4]}$$

Afterwards, as illustrated in part (d), the trust calculation unit 140 can calculate the trust value ($t_i$) for each of the multiple nodes as in Equation 5, by multiplying the mean trust value ($u_i$) of each node calculated from Equation 2 with the trust weight ($W_i$) calculated from Equation 3.

$$t_i = W_i u_i \quad \text{[Equation 5]}$$

Here, calculating the trust value ($t_i$) for each node as a product of the mean trust value ($u_i$) and the trust weight ($W_i$) is so that penalties may be applied to both abnormal consensus of malicious nodes and abnormal trust report activity and thereby lower the trust levels of malicious nodes.

In the case of cosine similarity, if two inputs are positive real values, then the resultant value converges within the range of [0, 1], and therefore the mean trust value ($u_i$) and trust weight ($W_i$) and the trust value ($t_i$) may also converge within the range of [0, 1].

When a node serves as a shard manager, the corresponding node can further include a trust storage unit 160 and a shard distribution unit 170.

The trust storage unit 160 may store the trust value ($t_i$) for each of the multiple nodes calculated by the trust calculation unit 140. The shard distribution unit 170 may distribute the multiple nodes to a predefined K number of shards. Here, the shard distribution unit 170 may distribute the multiple nodes based on the trust value ($t_i$) for each of the multiple nodes stored in the trust storage unit 160 such that the deviations in shard trust values between the K number of shards is the smallest.

That is, defining a shard trust value ($S_{gk}$) (where k=1, . . . , K) as the total sum of the trust values ($t_i$) of the nodes included in each of the K shards, the shard distribution unit 170 may distribute the multiple nodes to the K number of shards such that the function of Equation 6, which represents the deviations in shard trust values between the multiple shards, yields the smallest value.

$$\sum_{i=1}^{K} \sum_{j=1}^{K} \sqrt{\frac{(S_{gi} - S_{gj})^2}{K}} \quad (i, j \in K) \quad \text{[Equation 6]}$$

In particular, in this embodiment, the shard distribution unit 170 can distribute the multiple nodes to the multiple shards such that the function of Equation 6 is minimized by applying a genetic algorithm.

A genetic algorithm is a global optimization technique developed as a class of evolutionary algorithms, which are based on natural evolution. A genetic algorithm is a technique that searches for an optimal solution based on a 'survival of the fittest' approach using the two processes of a crossover and a mutation. When solving an optimization problem, the genetic algorithm expresses the data structure representing the set of possible solutions as chromosomes and proceeds with crossover and mutation operations to find an optimal solution that satisfies a particular objective function.

FIGS. 3 to 5 visually represent a process by which the shard distribution unit 170 may distribute multiple nodes to a multiple number of shards based on a genetic algorithm. An example is illustrated in which the shard distribution unit 170 distributes six nodes ($N_1 \neq N_6$) of a blockchain network to three shards ($S_1$, $S_2$, $S_3$).

FIG. 3 illustrates an initial distribution process before applying the genetic algorithm. Referring to FIG. 3, the shard distribution unit 170 during the initial distribution process can distribute the six nodes ($N_1 \sim N_6$) of the blockchain network, shown in part (a), randomly to the three shards ($S_1$, $S_2$, $S_3$), as shown in part (b). Then, as shown in part (c), the indexes ($S_1$, $S_2$, $S_3$) of the shards may be arranged according to the order of the distributed six nodes ($N_1 \sim N_6$) to obtain a chromosome. Here, the shard indexes arranged in each obtained chromosome can be regarded as a gene. Here, the shard distribution unit 170 does not obtain just one chromosome but rather can obtain multiple chromosomes by distributing the six nodes ($N_1 \sim N_6$) in various combinations. The multiple chromosomes thus obtained by randomly distributing the multiple nodes ($N_1 \sim N_6$) to the multiple shards ($S_1$, $S_2$, $S_3$) may be used as parent chromosomes. The shard distribution unit 170 can obtain a multiple number of parent chromosomes as an initial parent chromosome set (P). From the initial parent chromosome set (P), an M number of parent chromosomes may be selected for use in crossovers and mutations.

Afterwards, the shard distribution unit 170 may select pairs for crossing over genes from among the M (for instance, 50) number of parent chromosomes. The shard distribution unit 170 may select an $_MC_2$ number of ordered pairs for crossing over genes and may select two parent chromosomes according to the generated ordered pairs. In the two selected parent chromosomes, at least one gene may be exchanged.

Referring to FIG. 4, the shard distribution unit 170 may, as illustrated in part (a), select at least one corresponding node in each of the two parent chromosomes selected according to the generated ordered pairs as crossover genes (in the illustrated example, the second node ($N_2$) and the fifth node ($N_5$)) and may cross over the shards to which the nodes of the selected crossover genes were distributed, to thereby obtain offspring chromosomes as illustrated in part (b). It can be seen that the offspring chromosomes illustrated in part (b) of FIG. 4 differ from the parent chromosomes illustrated in part (a) in that the second node ($N_2$) and the fifth node ($N_5$) have been exchanged. Here, the shard distribution unit 170 can select the nodes of the parent chromosomes in a predefined number (N) and can select the nodes that are to be crossed over according to a predefined crossover probability ($P_c$) (for instance, 0.8).

When the offspring chromosomes are obtained, the shard distribution unit 170 may select a mutation gene from at least one of the obtained offspring chromosomes and mutate the gene.

Referring to FIG. 5, the shard distribution unit 170 can select a node for mutating (in the illustrated example, the fifth node ($N_5$)) according to a predefined number (N) and a predefined mutation probability ($P_m$) (for instance, 0.1) in the offspring chromosomes obtained as in part (b) of FIG. 4. The selected node may be distributed to a shard ($S_3$) other than the shard ($S_1$) currently distributed to. That is, the selected mutation gene may be changed.

In this embodiment, in particular, the shard distribution unit 170 can mutate genes with the directionality of the evolution set additionally to prevent redundant trust values during the mutation process. To this end, when changing a mutation gene, the shard distribution unit 170 may search for a shard to which a node having the same trust value has not been distributed and may mutate the gene by distributing the corresponding node to such a shard.

As illustrated in FIG. 5, when the offspring genes of ($S_1$, $S_2$, $S_1$, $S_3$, $S_1$, $S_2$) have been obtained and the gene ($S_1$) corresponding to the fifth node ($N_5$) is to be mutated, the shard ($S_1$) that the gene is currently distributed to should be excluded, and the gene may be mutated to either of the second and third shards ($S_2$, $S_3$). Here, if the trust value ($t_5$) of the fifth node ($N_5$) and the trust value ($t_2$) of the second node ($N_2$) are the same, then the gene ($S_1$) corresponding to the fifth node ($N_5$) should be mutated to a gene other than the gene ($S_2$) corresponding to the second node ($N_2$). That is, the gene ($S_1$) corresponding to the fifth node ($N_5$) may be mutated to the third shard ($S_3$).

By thus having nodes of similar trust values distributed to different shards, the nodes may not be concentrated in a particular shard and may be forcibly separated and distributed to different shards, thereby increasing the likelihood of a block being modulated by malicious nodes, compared to the existing method of randomly distributing multiple nodes to form multiple shards.

After the mutation process, the shard distribution unit 170 may generate an offspring chromosome set (O) and, for the offspring chromosome set (O) thus generated, may again extract an M number of chromosomes having an optimal value that minimizes the function of Equation 6 and repeat the processes of crossover and mutation. After iterating the processes until the trust value deviations between shards obtained from Equation 6 becomes smaller than or equal to a predefined threshold deviation or after a predefined number of iterations, the multiple number of nodes may be distributed to the multiple number of shards based on the resulting offspring chromosomes.

Figure 6:
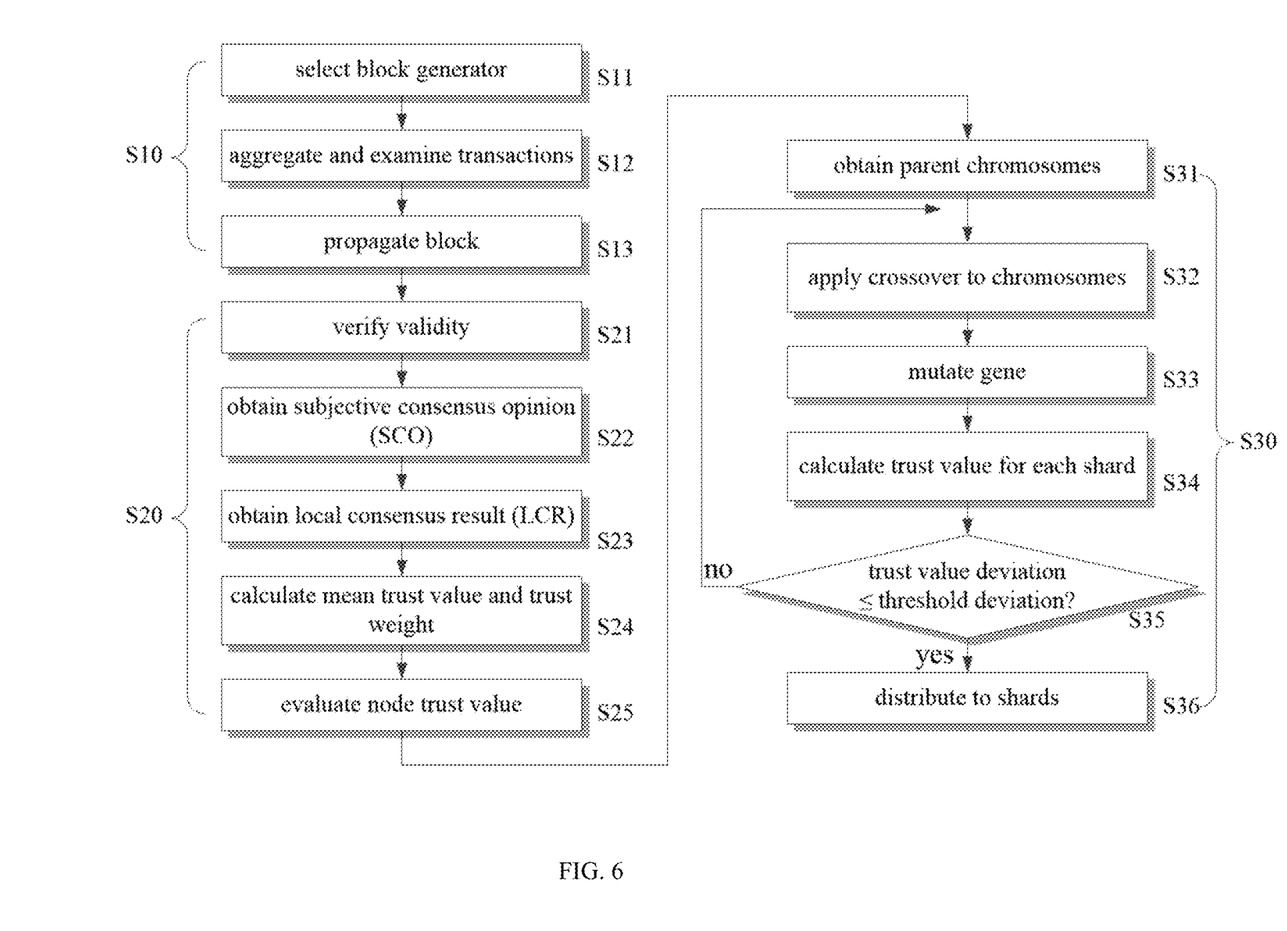
FIG. 6 illustrates a shard distribution method for a blockchain network according to an embodiment of the disclosure.

FIG. 6 illustrates a shard distribution method for a blockchain network according to an embodiment of the disclosure.

Describing the shard distribution method of FIG. 6 with reference to FIGS. 1 to 5, the shard distribution method can mainly include a block generation step (S10) of generating a block, a trust calculation step (S20) of obtaining the trust value for each of the multiple nodes based on the block consensus result obtained from each node, and a node distribution step (S30) of distributing the multiple nodes such that the shard trust deviations between the multiple shards are minimized based on the trust value obtained for each node.

In the block generation step (S10), first a block generator may be selected from among the multiple nodes of the blockchain network (S11). The block generator can be selected, for example, by way of a proof of work (PoW) or a proof of stake (PoS) technique. The node selected as the block generator may collect, record, and verify the transactions that are to be processed and thus generate a block (S12). The generated block may be propagated to the other nodes (S13).

In the trust calculation step (S20), each of the multiple nodes that has received the block may verify the validity of the received block to determine whether to approve (Y) or disapprove (N) the corresponding block (S21). Each of the multiple nodes may aggregate its own validity verification result and the validity verification results of the other nodes to obtain an SCO vector ($S_i$) and may propagate the obtained SCO vector ($S_i$) to a shard manager designated beforehand from among the multiple nodes, i.e. to the shard distribution apparatus (S22). Here, based on the obtained SCO vectors ($S_i$) obtained from the multiple nodes, if it is determined that more than half of the multiple nodes have approved of the generated block, then the corresponding block may be determined as a valid block and may be stored connected to the previously stored blockchain. Also, the blockchain thus stored can be propagated to the other nodes.

The shard manager may aggregate the SCO vector ($S_i$) transmitted from each of the multiple nodes to obtain an LCR matrix (L) (S23). Here, the shard manager can convert the approval (Y) and disapproval (N) information in each of the SCO vectors ($S_i$) transmitted from the multiple nodes into ratios of the numbers of approvals (Y) and disapprovals (N) and may combine the results to obtain an LCR matrix (L).

Once the LCR matrix (L) is obtained, the LCR matrix (L) may be used to calculate trust weights ($W_i$) (S24) based on the mean trust value ($u_i$), which represents the trust values for each of the multiple nodes as evaluated by other nodes, and the degrees of similarity between SCO vectors ($S_i$) obtained from the multiple nodes.

Then, the trust value ($t_i$) may be evaluated for each node by multiplying the calculated mean trust value ($u_i$) and trust weight ($W_i$) for each of the multiple nodes (S25).

Once the trust value ($t_i$) evaluated for each of the multiple nodes is obtained, then in the node distribution step (S30), the multiple nodes may be distributed to the multiple shards based on the obtained trust values ($t_i$). Here, the shard manager can distribute the multiple nodes to the multiple shards based on a genetic algorithm.

In the node distribution step (S30), the shard manager may first randomly distribute the multiple nodes to a predefined number of shards and may arrange the indexes of the shards to which the multiple nodes have been distributed as genes to obtain a multiple number of parent chromosomes (S31). Then, from the parent chromosomes thus obtained, parent chromosomes for crossing over genes with each other may be selected in pairs, and a predefined number of genes corresponding to each other may be selected and exchanged from each two selected parent chromosomes according to a predefined probability ($P_c$). That is, the shard indexes ($S_i$) of certain genes of the parent chromosomes may be crossed over to obtain offspring chromosomes (S32).

Afterwards, from the offspring chromosomes thus obtained, a predefined number of genes may be selected according to a predefined probability ($P_m$), and the genes may be mutated (S33) by changing the shard index of the selected gene to another shard index. Here, the shard manager may determine whether or not there is a gene present in the offspring chromosome that corresponds to a node having the same trust value as the trust value ($t_i$) of the node corresponding to a mutation gene selected for mutation and, if there is a gene having the same trust value, then may mutate the gene to a shard index other than the shard index of the corresponding gene.

Then, the mutated offspring chromosome may be analyzed, and the shard trust value ($S_g$) for each of the multiple shards may be calculated as a sum of the trust values ($t_i$) of the nodes included in each shard (S34). When the shard trust value for each of the multiple shards is calculated, it may be determined whether or not the shard trust deviations, which are an accumulation of the deviations between the calculated shard trust values ($S_g$), are smaller than or equal to a threshold deviation (S35). If the shard trust deviations are smaller than or equal to the threshold deviation, the multiple nodes may be distributed to the multiple shards based on the currently obtained offspring chromosome (S36). However, if the shard trust deviations exceed the threshold deviation, the offspring chromosomes may be crossed over and the genes may be exchanged to obtain further offspring chromosomes (S32).

Figure 7:
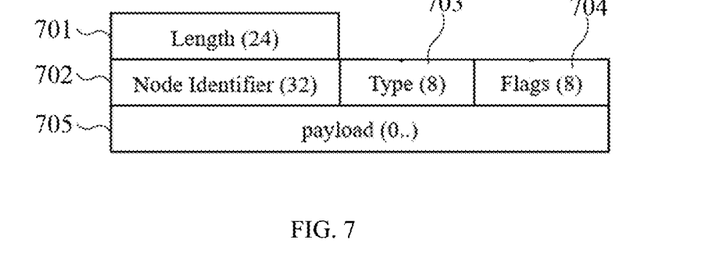
FIG. 7 illustrates the structure of a message exchanged between the nodes of a blockchain network.

FIG. 7 illustrates the structure of a message exchanged between the nodes of a blockchain network.

In FIG. 7, the length field 701 represents the length of the frame, the node identifier field 702 represents the address of the node transmitting the message, and the type field 703 represents the type of message. Here, the type of message can be classified as for proposing a block, reporting an SCO, informing whether or not the validity of a received block has been examined, propagating a block that has gained consensus, etc. The flag field 704 can represent other information such as the round number of the corresponding block, for example. The payload field 705 may contain data that varies according to the message type and, when proposing a generated block for example, can include transactions for processing by the shard that have been allocated to the current round. When the message is for the results of examining the validity of a received block, the field can include binary data representing an approval or disapproval of the corresponding block. Also, when the message type is for a subjective consensus opinion (SCO) transmitted to the shard manager, the SCO vector can be included. When the transmitted data is for a block that has gained consensus, data related to the corresponding block can be included.

Figure 8:
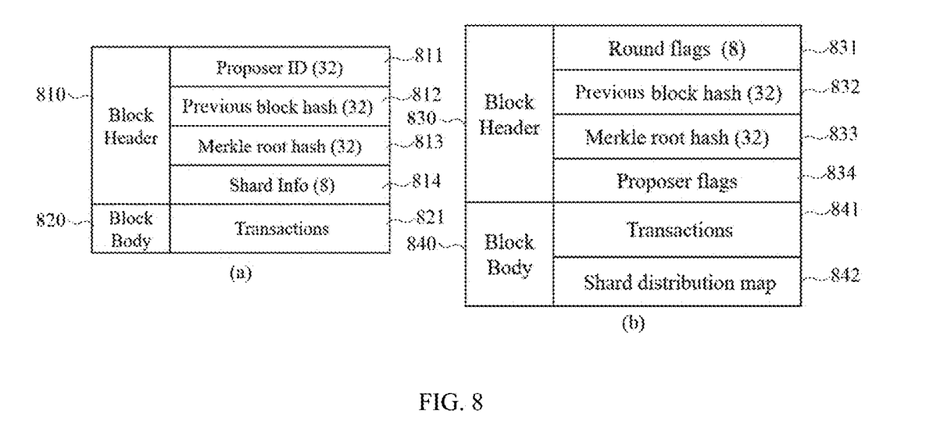
FIG. 8 illustrates the structure of a block in a blockchain network according to an embodiment of the disclosure.

FIG. 8 illustrates the structure of a block in a blockchain network according to this embodiment.

A block in a shard-distributed blockchain network can be classified as a side block, illustrated in part (a), and a main block, illustrated in part (b).

A side block is a block stored in each shard and is temporarily stored to generate a main block, while a main block is the final block that is determined with reference to the side block stored in each shard.

As illustrated in parts (a) and (b) of FIG. 8, a block can be composed of a block header 810, 830 and a block body 820, 840.

In the side block shown in part (a), the block header 810 can include a proposer ID 811, a previous block hash 812, a Merkle root hash 813, and shard information 814. The proposer ID 811 may represent the address of the block generator in the corresponding shard, the previous block hash 812 may represent the overall hash value of the previous shard block, and the Merkle root hash 813 may represent the Merkle root hash for the transaction. The shard information 814 can be used to show which number shard and which number round the corresponding block belongs to. In the block body 820, the transactions 821 may represent the group of transactions processed at the corresponding shard.

The main block shown in part (b) may be generated based on the block data of each shard. The main block is a block that must necessarily be stored by all verification nodes of the blockchain network and has a structure different from the existing Bitcoin block. The nonce and difficulty fields used in the existing Bitcoin block structure have been removed, as these are fields for applying the proof of work (PoW) technique.

In the block header 830 of a main block, the round flags 831 is a field representing which number block the corresponding block is, where a block version, a time stamp, etc., can be added. The previous block hash 832 may represent the overall hash value of the previous shard block, and the Merkle root hash 833 may represent the Merkle root hash for the transaction. The proposer flags 834 is a flag field for the identifier of the block generator and may include the address of the block generator of each shard.

The block body 840 may include a transactions field 841 and a shard distribution map field 842. The transactions field 841 is a field including all of the data of the transaction field 821 of each shard and can include information on the transactions of the overall network. The shard distribution map field 842 is a field representing the shard distribution formed by the shard manager and can be used to check the shard number as well as to prevent the falsifying of the shard distribution.

Figure 9:
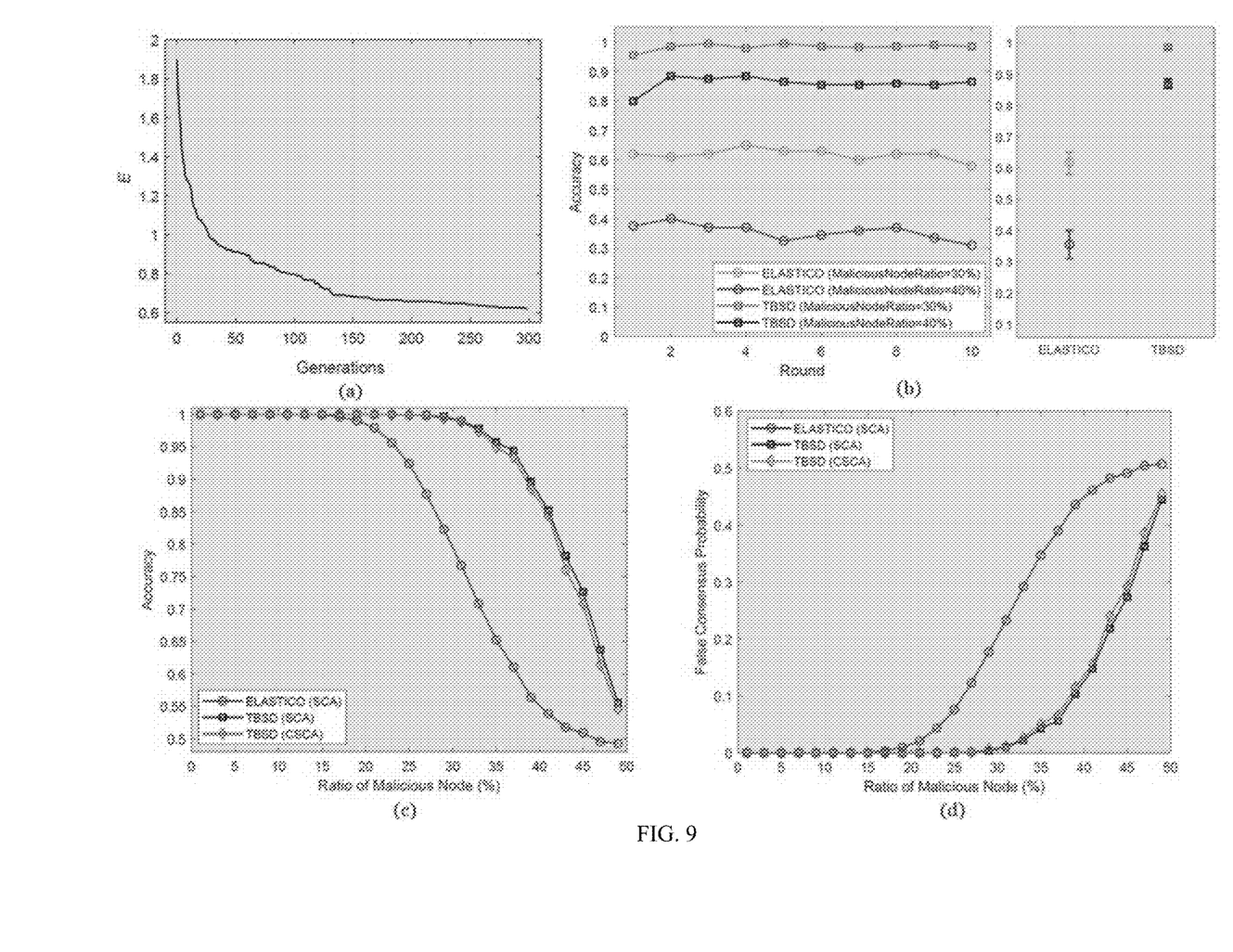
FIG. 9 shows the simulation results for the performance of a trust-based shard distribution apparatus and method according to an embodiment of the disclosure.

FIG. 9 shows the simulation results for the performance of a trust-based shard distribution apparatus and method according to this embodiment.

In FIG. 9, the number of verification nodes in the blockchain network is 400, the number of shards (K) is ten, and the crossover probability ($P_c$) and mutation probability ($P_m$) were set to 0.8 and 0.1, respectively. The number of parent chromosomes (M) for use in the crossovers and mutations was set to 50.

Here, two types of performance criteria were used—accuracy (ACC) and false consensus probability (FCP). Accuracy was calculated for two cases—the case of normal blocks receiving a validating judgment by multiple normal nodes and the case of abnormal blocks receiving an invalidating consensus by multiple normal nodes. The false consensus probability (FCP) was calculated for two cases—the case of normal blocks receiving an invalidating judgment by multiple malicious nodes and the case of abnormal blocks receiving a validating judgment by multiple malicious nodes to be connected to the chain.

Types of attacks on the network assumed two situations of a selective consensus attack (SCA) and a compromised selective consensus attack (CSCA). In an SCA, malicious nodes always judge normal blocks to be invalid but, when an abnormal block is generated, judges this to be a normal block. It is assumed that when a malicious node becomes the proposer, it always generates a faulty block. However, in this type of attack, the malicious node only performs the consensus abnormally and does not falsely report trust values to the shard manager. A CSCA is an attack type that includes trust report modulation activity in addition to the SCA type and reports trust activity in an opposite manner in addition to the attacks of the SCA. For example, if three nodes have made an evaluation of (Y, Y, N) for a proposed block, the CSCA attacker would report (N, N, Y) to the shard manager. A CSCA thus makes false trust value reports to the shard manager, making it more difficult to calculate trust values.

In FIG. 9, graph (a) shows the results of how the RMS error value (E) changes according to the number of generations. It can be seen that the RMS error value is decreased with more generations and that the error (E) converges after about 300 generations. Therefore, in this embodiment, the number of iterations of the round-based genetic algorithm was limited to 300 generations.

Graph (b) shows changes in accuracy performance according to round as compared to ELASTICO, which is an existing shard-based blockchain technique. It can be seen that, for both of the two cases in which the ratios of malicious nodes are 30% and 40% respectively, the proposed algorithm TBSD provides higher accuracy compared to ELASTICO, as well as higher conversion properties for the error boundaries, as shown in the right-hand side plot of graph (b). Whereas ELASTICO determines shards randomly at each round, the proposed technique minimizes the trust error for each shard based on trust values, so that a much more stable consensus success rate may be achieved.

Graphs (c) and (d) show the accuracy and false consensus probability (FCP) of each technique under an SCA and a CSCA. Since ELASTICO is not a trust-based system, the same results are provided under an SCA and a CSCA. In graph (c), the consensus success rate begins to decline after the ratio of malicious modes exceeds about 20%. This is in contrast to existing PBFT techniques showing resistance to malicious users below ⅓, and such a result may occur due to the effect of sharding, as a majority of the nodes required for block verification in certain shards may already have been compromised by malicious users. TBSD shows superior ACC and FCP compared to ELASTICO, with the case under a CSCA showing a slight decline in performance compared to the case under an SCA due to the inclusion of the trust report activity. This may be because, in the case of a CSCA where the trust values are modulated, the trust calculation unit examines the degrees of similarity of the trust reports to weaken the overall attack effect resulting from the penalty effect produced by false reports. As it is realistically unlikely that the ratio of malicious nodes in the overall network will exceed a majority, the proposed TBSD technique can be regarded as guaranteeing a higher consensus success rate against malicious attacks on a shard-based blockchain.

A method according to an embodiment of the disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM(random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present invention is to be defined by the technical spirit set forth in the appended scope of claims.

What is claimed is:

1. A shard distribution apparatus comprising:
    a trust calculation circuitry configured to obtain a trust value for each of a plurality of nodes in a blockchain network by receiving a consensus result from each of the plurality of nodes, the consensus result obtained by aggregating a result of verifying a validity of a block by each of the plurality of nodes and results of verifying a validity of the block received from other nodes; and
    a shard distribution circuitry configured to distribute the plurality of nodes to a plurality of shards by calculating a plurality of shard trust values represented by a sum of trust values of nodes distributed to each of the plurality of shards and distributing the plurality of nodes such that deviations of the calculated shard trust values are the smallest,
    wherein the shard distribution circuitry receives a subjective consensus opinion (hereinafter referred to as "SCO") vector from each of the plurality of nodes of the blockchain network, combines the SCO vector to obtain a local consensus result (hereinafter referred to as "LCR') matrix, and calculates the trust value for each of the plurality of nodes by using the LCR matrix, and
    wherein each of the plurality of nodes obtains the SCO vector by verifying a validity of a block and aggregating its validity verification result with validity verification results made by other nodes.

2. The shard distribution apparatus of claim 1, wherein the shard distribution circuitry distributes the nodes such that nodes having a same trust value are not assigned to a same shard.

3. The shard distribution apparatus of claim 1, wherein the shard distribution circuitry:
    distributes the plurality of nodes randomly to the plurality of shards, arranges indexes of the shards to which the plurality of nodes have been distributed as genes to obtain a plurality of parent chromosomes,
    selects at least one gene from among genes of a pair of parent chromosomes selected from the plurality of parent chromosomes and exchanges corresponding genes to obtain offspring chromosomes,
    selects at least one gene from the obtained offspring chromosomes and mutates the selected gene to another shard index, accumulates deviations between trust values obtained for the plurality of shards based on shard indexes formed as genes arranged in the mutated offspring chromosomes,
if the accumulated trust value deviations do not exceed a predefined threshold deviation, then distributes the plurality of nodes based on the shard indexes formed as genes arranged in the mutated offspring chromosomes, and
if the accumulated trust value deviations do exceed the threshold deviation, then sets the offspring chromosomes as parent chromosomes and again obtains and mutates offspring chromosomes.

4. The shard distribution apparatus of claim 3, wherein the shard distribution circuitry selects at least one gene from the offspring chromosomes, determines a node having a same trust value as that of the node corresponding to the selected gene, and provides mutation such that a shard index for the selected gene is different from that of the node determined as having the same trust value.

5. The shard distribution apparatus of claim 1, wherein the trust calculation circuitry:
receives a plurality of SCO vectors, converts approvals and disapprovals in each of the plurality of SCO vectors into numerical values according to ratios of a number of approvals and a number of disapprovals, combines the SCO vectors to obtain the LCR matrix, the SCO vector obtained by each of the plurality of nodes individually aggregating approvals and disapprovals determined as validity verification results at the plurality of nodes,
calculates a mean trust value based on numerical values of the LCR matrix, the mean trust value representing an evaluation by other nodes of each of the plurality of nodes,
calculates a trust weight based on numerical values of the LCR matrix, the trust weight representing a degree of similarity between the plurality of SCO vectors, and
calculates a trust value for each of the plurality of nodes by multiplying the calculated mean trust value with the trust weight.

6. A shard distribution method comprising:
obtaining a trust value for each of a plurality of nodes in a blockchain network by receiving a consensus result from each of the plurality of nodes, the consensus result obtained by aggregating a result of verifying a validity of a block by each of the plurality of nodes and results of verifying a validity of the block received from other nodes; and
distributing the plurality of nodes to a plurality of shards by calculating a plurality of shard trust values represented by a sum of trust values of nodes distributed to each of the plurality of shards and distributing the plurality of nodes such that deviations of the calculated shard trust values are the smallest,
wherein the obtaining of the trust value comprises:
receiving a plurality of SCO vectors, the SCO vectors obtained by each of the plurality of nodes aggregating its validity verification result for a block with validity verification results made by other nodes;
obtaining a local consensus result (hereinafter referred to as "LCR") matrix by converting the plurality of SCO vectors received respectively from the plurality of nodes in a predefined manner and combining the SCO vectors; and
calculating a trust value for each of the plurality of nodes by using the LCR matrix.

7. The shard distribution method of claim 6, wherein the distributing of the plurality of nodes comprises distributing the nodes such that nodes having a same trust value are not assigned to a same shard.

8. The shard distribution method of claim 6, wherein the distributing of the plurality of nodes comprises:
obtaining a plurality of parent chromosomes by distributing the plurality of nodes randomly to the plurality of shards and arranging indexes of the shards to which the plurality of nodes have been distributed as genes;
obtaining offspring chromosomes by selecting at least one gene from among genes of a pair of parent chromosomes selected from the plurality of parent chromosomes and exchanging corresponding genes;
mutating at least one gene selected from the offspring chromosomes into another shard index; and
obtaining a shard trust value by calculating a sum of trust values of nodes included in each of the plurality of shards based on the shard indexes arranged as genes in the mutated offspring chromosomes;
accumulating deviations between trust values obtained for the plurality of shards;
distributing the plurality of nodes based on the shard indexes formed as genes arranged in the mutated offspring chromosomes if the accumulated trust value deviations do not exceed a predefined threshold deviation; and
setting the offspring chromosomes as parent chromosomes and obtaining and mutating offspring chromosomes again if the accumulated trust value deviations do exceed a predefined threshold deviation.

9. The shard distribution method of claim 8, wherein the mutating into another shard index comprises:
selecting at least one gene from the offspring chromosomes,
determining a node having a same trust value as that of the node corresponding to the selected gene; and
mutating the selected gene such that a shard index for the selected gene is different from that of a node determined as having the same trust value if it is determined that there is a node having the same trust value.

10. The shard distribution method of claim 6, wherein the calculating of the trust value comprises:
calculating a mean trust value based on numerical values of the LCR matrix, the mean trust value representing an evaluation by other nodes of each of the plurality of nodes,
calculating a trust weight based on numerical values of the LCR matrix, the trust weight representing a degree of similarity between the plurality of SCO vectors; and
calculating a trust value for each of the plurality of nodes by multiplying the calculated mean trust value with the trust weight.

11. The shard distribution method of claim 6, wherein the obtaining of the LCR matrix comprises converting approvals and disapprovals in each of the plurality of SCO vectors into numerical values according to ratios of a number of approvals and a number of disapprovals, and combining the SCO vectors to obtain the LCR matrix.

12. A non-transitory recorded medium having recorded thereon a program of instructions for executing the shard distribution method according to claim 6.

* * * * *